(12) United States Patent
Massie et al.

(10) Patent No.: US 6,510,065 B1
(45) Date of Patent: Jan. 21, 2003

(54) PHASED RIPPLE DC-TO-DC CONVERTER

(75) Inventors: Harold L. Massie, Tumwater, WA (US); Edward L. Payton, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/836,049

(22) Filed: Apr. 16, 2001

Related U.S. Application Data

(63) Continuation of application No. 09/351,108, filed on Jul. 6, 1999, now abandoned.

(51) Int. Cl.[7] .............................. H02M 7/00; G05F 1/40
(52) U.S. Cl. .......................... 363/65; 363/71; 323/283
(58) Field of Search ........................... 363/65, 71, 72, 363/16, 20, 17; 323/282, 283, 284, 272

(56) References Cited

U.S. PATENT DOCUMENTS

| | | | | |
|---|---|---|---|---|
| 3,792,286 A | * | 2/1974 | Meler | 307/58 |
| 4,685,039 A | * | 8/1987 | Inou et al. | 363/16 |
| 5,508,903 A | * | 4/1996 | Alexndrov | 363/16 |
| 5,682,303 A | * | 10/1997 | Goad | 363/71 |
| 5,973,485 A | * | 10/1999 | Kates et al. | 323/272 |
| 6,147,526 A | * | 11/2000 | Skelton et al. | 327/134 |

* cited by examiner

Primary Examiner—Rajnikant B. Patel
(74) Attorney, Agent, or Firm—John F. Kacvinsky

(57) ABSTRACT

Briefly, in accordance with one embodiment of the invention, a circuit includes: a DC-to-DC converter. The DC-to-DC converter includes a plurality of ripple regulator DC-to-DC converter circuits. The plurality of circuits are coupled so that the output signals produced by each of the ripple regulator DC-to-DC converter circuits is out of phase with respect to the other of the ripple regulator DC-to-DC converter circuits.

21 Claims, 3 Drawing Sheets

DC-to-DC Converter

PHASED RIPPLE DC-TO-DC CONVERTER

This is a continuation of Application No. 09/351,108, filed Jul. 6, 1999, now abandoned.

BACKGROUND

1. Field

The present invention relates to voltage converters and, more particularly, to DC-to-DC voltage converters.

2. Background

DC-to-DC converters are well-known in the art. Such circuitry or devices are typically employed to convert from one DC voltage signal level to another DC voltage signal level. This may be useful in a variety of embodiments.

One situation that is frequently an issue with such converters occurs when a sizable load is applied to the converter. A relatively sudden increase in load may be approximated as a step function and, as is well-known, typically results in a transient voltage signal in the circuitry to which the step function is applied. Therefore, typically a transient voltage signal will occur in those situations in which a sudden increase in load is applied to a DC-to-DC converter. Such transients, however, are undesirable because one of the functions of a DC-to-DC converter is to maintain an output voltage signal level within a particular voltage signal window or within a set of voltage signal boundaries to ensure, for example, that the operation of the circuitry being powered by the DC-to-DC converter is not substantially affected by the sudden increase in load.

One way that state of the art DC-to-DC converters address the situation is by employing bulk capacitance. Therefore, when the transient results from the application of a sizable load, the capacitors release stored charge to compensate at least partially for the transient voltage signal and to provide the DC-to-DC converter additional time to adjust to the increase in load.

Unfortunately, the use of bulk capacitance has several disadvantages. For example, such capacitance takes up additional room in the system in which the DC-to-DC converter is being employed. Likewise, in production, adding this bulk capacitance to the circuitry is relatively inconvenient and, therefore, also introduces additional expense and time in the production process. Another approach is to employ what is referred to as ripple regulation. Where this approach is employed, the voltage and current may oscillate between different levels at a particular frequency. However, in some situations, these may undesirably affect overall performance and/or circuit operation because it may make it difficult to maintain tight tolerance on the output voltage and/or current, due at least in part to the amount of variation in voltage and current that may occur as a result of the ripple. Therefore, it would be desirable if a technique or method were available to maintain the output voltage signal level within the desired voltage signal window or voltage signal level bounds even when a sizable or significant load is applied, while reducing at least some of the disadvantages associated with the use of either standard ripple regulation and/or bulk capacitance.

SUMMARY

Briefly, in accordance with one embodiment of the invention, a circuit includes: a DC-to-DC converter. The DC-to-DC converter includes a plurality of ripple regulator DC-to-DC converter circuits. The plurality of circuits are coupled so that the output signals produced by each of the ripple regulator DC-to-DC converter circuits is out of phase with respect to the other of the ripple regulator DC-to-DC converter circuits.

BRIEF DESCRIPTION OF THE DRAWINGS

The subject matter regarded as the invention is particularly pointed out and distinctly claimed in the concluding portion of this specification. The invention, however, both as to organization, and method of operation, together with objects, features, and advantages thereof, may best be understood by reference to the following detailed description, when read with the accompanying drawings in which:

DETAILED DESCRIPTION

In the following detailed description numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
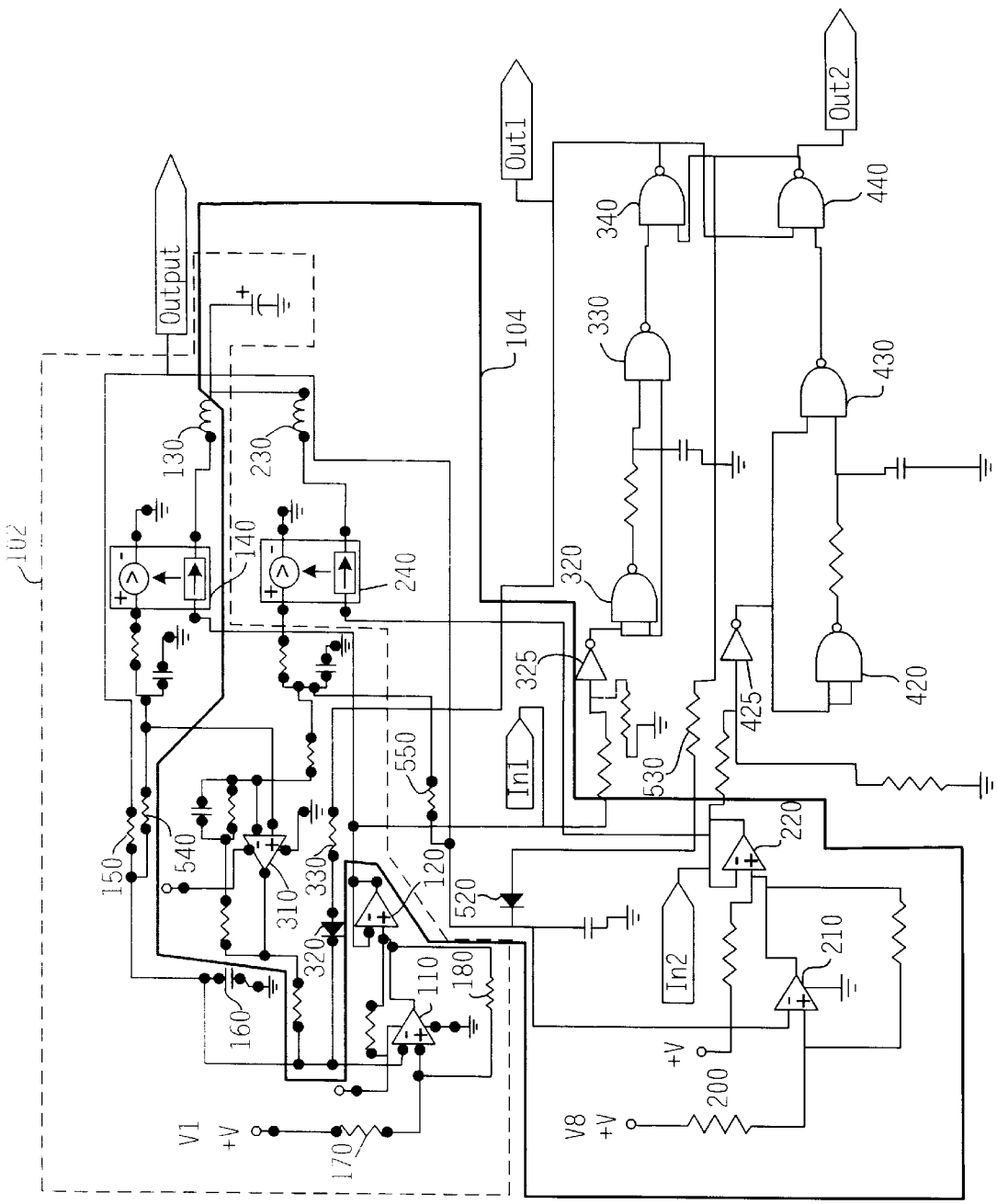
FIG. 1 is a circuit diagram illustrating an embodiment in accordance with the present invention.

FIG. 1 has a circuit diagram illustrating an embodiment 100 of a DC-to-DC converter in accordance with the present invention. The DC-to-DC converter includes a plurality of ripple regulator DC-to-DC converter circuits. In this context, a ripple regulator DC-to-DC converter circuit refers to a circuit that employs ripple regulation in the circuit in order to control the average voltage and/or current level produced by the DC-to-DC converter. The plurality of ripple regulator DC-to-DC converter circuits are coupled so that the output signal produced by one of the ripple regulator DC-to-DC converter circuits is out of phase with respect to the output signal of the other ripple regulator DC-to-DC converter circuits. The embodiment illustrated in FIG. 1 includes two ripple regulator circuits, although the invention is not limited in scope in this respect. For example, as described in more detail later, FIG. 2 includes an alternative embodiment in which four ripple regulator circuits are employed. In that embodiment, the output signal of the ripple regulator circuits are approximately 90 degrees output phase, whereas in the embodiment of FIG. 1, the output signal of the ripple regulator circuits are approximately 180 degrees out of phase; however, the invention is not limited in scope to a particular phase relationship other than being out of phase. Furthermore, subject to considerations of cost, efficiency, practicality, and other issues, any number of ripple regulator circuits may be employed. In this particular embodiment, as alluded to above and explained in more detail hereinafter, the two ripple regulator circuits are coupled so that the output signals produced by each are approximately 180 degrees out of phase with respect to the other, although, again the invention is not limited in scope in this respect.

Ripple regulator converter circuits are generally well-known. For example, although the invention is not limited in scope in this respect, patent application Ser. No. 09/130,524, entitled "DC-to-DC Converter with Transient Suppression," by Harold L. Massie filed on Aug. 5, 1998, assigned to the assignee of the present invention and herein incorporated by reference, describes one particular embodiment of a ripple regulator converter circuit, although the invention is not limited in scope in this respect.

Referring to FIG. 1, comparator 110 is employed to perform feedback control for one of the ripple regulator converters. A power buffer 120 is coupled to receive the output signal of comparator 110 and drives inductor 130 by a current to voltage converter 140. Power buffer 120, in this particular embodiment, represents combined high side/low side FETs in a synchronous rectifier configuration. In this particular embodiment, current to voltage converter 140 generates a voltage signal proportional to the applied current, for this particular ripple regulator converter. In the embodiment, the voltage may be generated by sampling the voltage across the output FETs of 120 (not shown), a current sense resistor in the high side or low side (not shown), or at the output port(not shown). The invention, of course, is not limited in scope to any particular technique to perform this current to voltage conversion. The voltage of 140 is summed together at 150 and 540 and applied to comparator 110. One advantage, in this particular embodiment, for changing the effective output voltage as a function of current is to provide additional margin for voltage transients. Due, at least in part to the operation of inductor 130, when the load current is lowest or near its lowest level, the output voltage level is at or near its highest level. Likewise, the output voltage is the lowest at full load current. Therefore, when a load transient occurs, the voltage has additional voltage range with this approach, by starting from a high voltage level versus a nominal voltage level. Of course, the invention is not limited in scope to employing this approach. Furthermore, another embodiment of this technique is described in patent application Ser. No. 08/848,842, entitled "DC-to-DC Converter," filed on Apr. 30, 1997, by Massie, assigned to the assignee and herein incorporated by reference. Therefore, V1, applied to comparator 110, is the reference voltage signal that is employed to set the output voltage signal for the comparator using feedback, as illustrated in this particular embodiment, so that inductor 130 is driven as a synchronous rectifier. Resistor 150 and capacitor 160 filter noise from the output feedback signal. Likewise, resistor 170 and resistor 180 form a hysterisis circuit which allows the ripple regulator converter circuit to function as desired. The hysterisis circuit operates here by applying two voltage levels at one of the comparator input pins, which are determined by the ratio of resistors 170 and 180. The voltage applied at that one input pin changes when the comparator output signal changes state. However, the comparator changes state when the output voltage reaches the voltage levels set by the reference and hysterisis voltage levels.

A portion of the embodiment illustrated in FIG. 1 includes comparator 210 driving a power buffer/synchronous rectifier 220 similar to 120, discussed above. Likewise, this power buffer drives inductor 230 via current or voltage converter 240, also similar to the approach previously described. Therefore, this ripple regulator converter also produces an output voltage signal related to the current applied. Here, operational amplifier 310 is employed to amplify the difference between the current sensors in converters 140 and 150 to thereby adjust the feedback voltage of comparator 110 so that the DC currents of the two converters are substantially the same. This is desirable in this particular embodiment with the two ripple regulators shown to have two different reference voltages, and the phase inhibit voltage level, discussed in more detail below, being set, in this particular embodiment, just below the operating ripple voltage. Otherwise, the phases would not be 180 degrees out of phase, as desired for this particular embodiment. If these two reference voltage levels are substantially equal, then this circuitry to adjust the voltage level may be omitted. Likewise, it may be omitted if it is not desired that the phases of the output signals be 180 degrees out of phase and the reference voltage levels are not substantially equal. In this embodiment, amplifier 310 operates to compare the two currents and provide feedback to equalize the two currents so that the phases of the output voltage signals are approximately 180 degrees out of phase. Of course, if a common reference is used, then this circuitry is not needed. Additionally, if the inhibit voltage level is made much larger than the operating ripple voltage, in this embodiment the peak-to-peak voltage around an output voltage level, then this circuitry may also be omitted. In such an embodiment, for transient, a separate comparator may be employed to activate all phases, rather than relying on the feedback approach employed in this particular embodiment. A similar approach has also been described in aforementioned patent application Ser. No. 09/130,514, entitled "DC-to-DC Converter with Transient Suppression." Of course, the invention is not limited in scope to any of these particular approaches.

The phasing of the two ripple regulator converters is accomplished using components 320, 330, 340, 420, 430 and 440. Inverter 325 inverts the voltage pulse applied to inductor 140 to trigger a negative pulse generator formed by components 320 and 330. The output signal produced by component 330 is the input signal of component 340, which is high in this particular embodiment, is triggered on the negative edge of the voltage pulse applied to inductor 140. It will, of course, be appreciated that the invention is not limited in scope to the particular components and/or conventions employed. Other components and other signal conventions, such as a rising edge, a falling edge, a high signal and a low signal, are included within the scope of the present invention.

The output signal of component 340 is coupled to the negative input port of comparator 110 via diode 320 and resistor 330. Therefore, once one of the ripple regulator converters completes its "on" cycle, the voltage applied to inductor 130 goes to zero or nearly zero. However, the output signal of component 340 is set high and, therefore, resistor 330 and diode 320 increase the feedback voltage applied to comparator 110 by a few milli-volts. This additional feedback voltage inhibits or prevents that ripple regulator converter from resuming its "on" cycle upon reaching voltage level, V1. However, the other ripple regulator converter does not have additional voltage added to one of its input ports, such as for comparator 210, for example, and, therefore, this converter will turn "on" at the established "on" voltage level for that ripple regulator converter, in this particular example, V8. This particular ripple regulator converter turns off if the output voltage has risen to the ripple regulator converter set point voltage, again, V8. However, turning off this ripple regulator converter sets the output signal of component 440 high, via components 420 and 430. Therefore, resistor 530 and diode 520 then inhibit this ripple regulator converter from turning "on" during the "on" cycle of the other ripple regulator converter. In addition, as previously alluded to above, resistor 540 ,and also resistor 550, provide "droop" control for the converter output voltage set points. For a load increase step, the voltage level can drop from ±3.5% to −5.0% versus a droop of from 0 to −5%, thereby providing more margin to deal with larger transients. More specifically, the output voltage is decreased as the output current is increased. The droop control would, at steady state, typically be ±3.5% at no load and −3.5% at full load.

Figure 2:
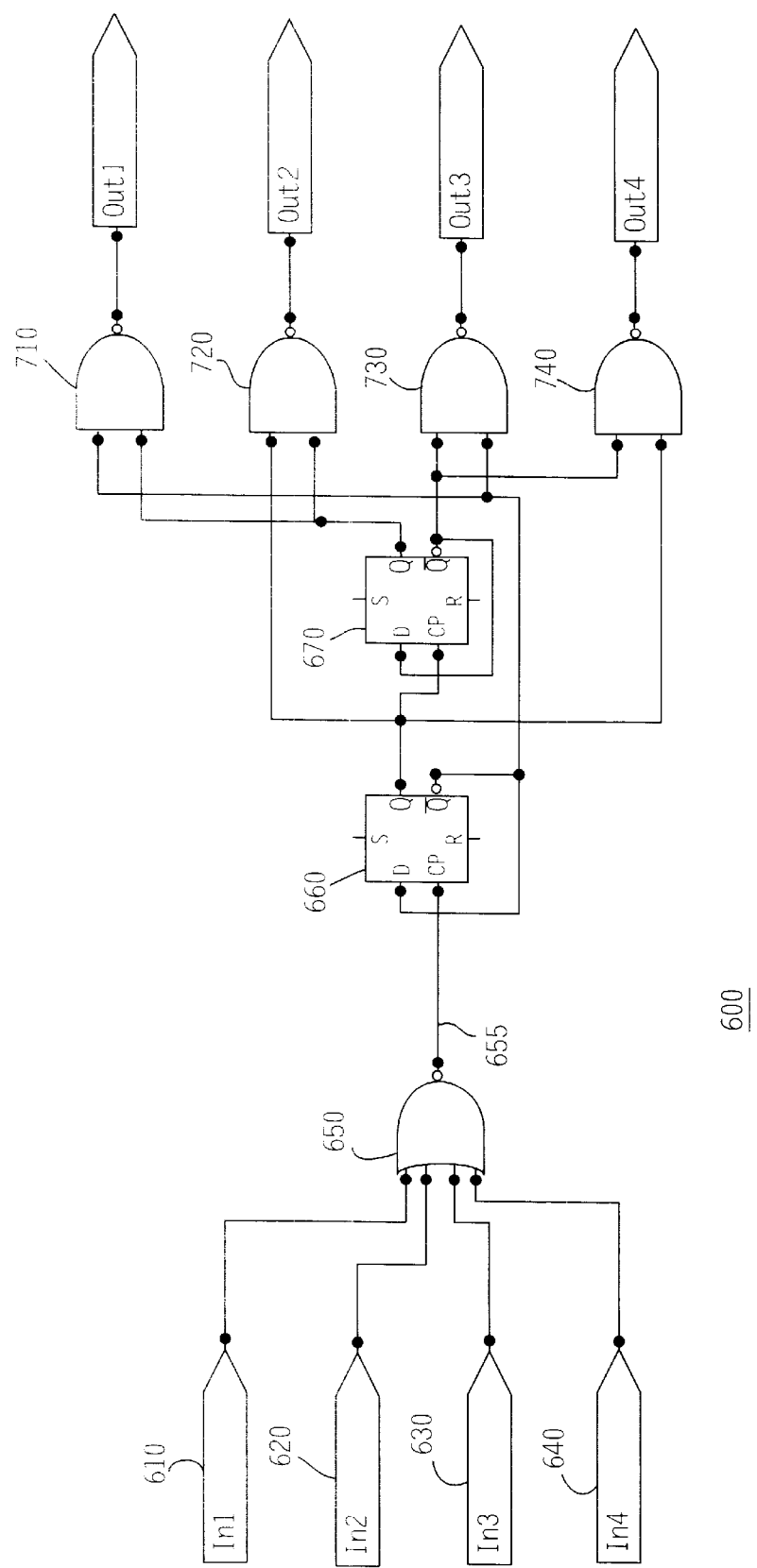
FIG. 2 is a circuit diagram illustrating an embodiment in accordance with the present invention.

FIG. 2 is a circuit diagram illustrating another embodiment of a portion of a DC-to-DC converter in accordance with the present invention. The circuitry may be employed to generate a four phase ripple regulator converter, although additional circuitry has been omitted for ease of explanation. More specifically, this particular embodiment illustrates the control logic, and other aspects of this circuitry, such as the comparators, current to voltage converters, and inductors. As illustrated, ports 610, 620, 630 and 640 receive inductor voltages. In this particular embodiment, component 650 comprises a NOR logic circuit which inverts a positive pulse applied to one of its input ports. Component 660 comprises a flip-flop that has been coupled to operate as a divide-by-two circuit. In this particular embodiment, this flip-flop is clocked on the rising edge of input port CP. Component 670 comprises another flip flop that has been coupled to operate as a divide-by-two circuit, however, this flip flop is clocked from the Q output port of flip flop 660. Components 710, 720, 730 and 740 provide the logic in order to generate the four phase signals that are used to inhibit each of the four ripple regulator circuits in order to produce an output voltage signal of the appropriate phase. Therefore, in this particular embodiment, 660 and 670 together form a divide-by-four counter.

Therefore, referring to the circuit illustrated in FIG. 2, the four inductor voltages are applied to the input ports. One of the output ports will be low and the remaining or other output ports being high. In this particular embodiment, although the invention is not limited in scope in this respect, these high signals prevent the ripple regulator converters corresponding to those particular output ports from turning "on" despite the output voltage level produced by the overall circuit achieving a voltage level that would result in those ripple regulator converters beginning their "on" cycle. However, for the ripple regulator converter to which voltage is applied to its inductor, the output port corresponding to that ripple regulator converter is in a low state so that the particular ripple regulator converter is enabled to turn "on" at the appropriate voltage level, as desired. Thus, in this manner, the phase at which the ripple regulator converter is turned "on" is controlled. When the inductor voltage transitions low on the enabled ripple regulator circuit, the counter is advanced one count to enable the next regulator. Likewise, the one that just "turned-off" will now become inhibited. Thus, the output pulse produced by 650, applied to 660 via 655, advances the counter each time an inductor voltage reaches zero or nearly zero, in this embodiment. A convenient aspect of this embodiment, although the invention is not limited in scope in this respect, is the lack of a relationship between couplings 610, 620, 630, and 640, and couplings 710, 720, 710, and 740. The counter simply enables the next ripple regulator circuit at the appropriate time.

Figure 3:
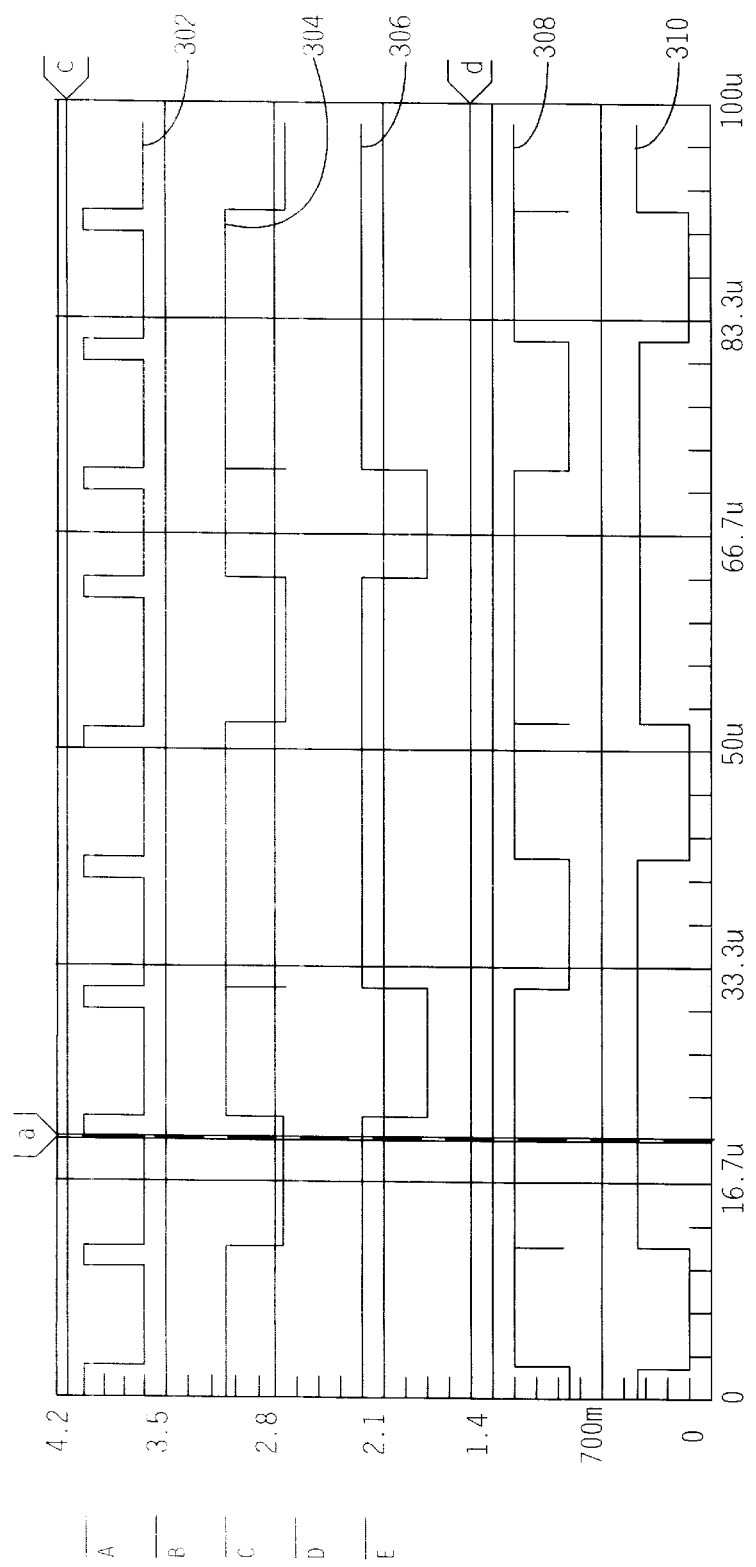
FIG. 3 is a plot illustrating signals that may be produced by the embodiment illustrated in FIG. 2.

FIG. 3 is a plot illustrating signals that may be produced by the embodiment illustrated. in FIG. 2. The top trace shows the voltage output signal of 650 at 655 in FIG. 2. Likewise, the other four waveforms are the output signals at 710, 720, 730, and 740. Thus, as illustrated and previously discussed, when these signals are low, the corresponding ripple regulator circuit is enabled.

An embodiment of a DC-to-DC converter in accordance with the present invention, such as the two embodiments previously described, for example, provides a number of advantages. For example, as previously decreased, these particular embodiments allow multiple ripple regulator converter circuits to function or operate together in a phased arrangement. Likewise, the input ripple current, specified peak to peak, for example, is effectively decreased by a factor related to the number of ripple regulator converter circuits that are employed. Because the magnitude of the input current is decreased, this reduces the number of input capacitors that would typically be employed. Similarly, the output ripple voltage signal is reduced by a factor that is also related to the number of ripple regulator converter circuits. This occurs because the output ripple frequency increases by a factor related to the number of ripple regulator converter circuits employed, and since the currents are phase related, the ripple current is further reduced by some phase offset. Likewise, yet another advantage of these embodiments, for example, is that the transient response of the DC-to-DC converter embodiment is improved because all the ripple regulator converter circuits turn on or off during a transient event in this embodiment, as previously alluded. More specifically, in this embodiment, during a load transient, the output voltage may fall below the voltage level, referred to in this context as the inhibit voltage level, used to inhibit one or more of the ripple regulator circuits providing one or more particular phases. In this embodiment, the inhibit voltage level was set to be just below the hysterisis voltage level so that, in this embodiment, all of the ripple regulator circuits may turn on during a transient resulting from an increase in load. The ripple regulator circuits in this embodiment are inhibited by just enough voltage to prevent operation during normal operation, but a transient will take the circuits out of the regulation range, so that all the phases are enabled to turn on.

As previously indicated, the invention is not limited in scope to a particular embodiment. For example, an embodiment may alternatively include a method of converting a voltage signal from approximately one voltage signal level to approximately another, as follows. A plurality of ripple regulated voltage output signals based, at least in part, on approximately the one voltage signal level may be produced. The plurality of ripple regulated output signals may be separated in phase so that each of the plurality is out of phase with respect the others of the plurality. The phase separated output signals are filtered to produce approximately another voltage level. Furthermore, there are a variety of additional possible variations within the scope of the present invention. For example, any number of ripple regulated voltage signals, such as two or four produced by the previously illustrated circuits, may be produced. Likewise, the plurality of ripple regulated output signals may be separated approximately equally in phase, for example, from the immediately preceding and succeeding ripple regulated output voltage signal. Likewise, feedback may be employed so that, for example, the ripple regulated output voltage signals may be regulated based, at least in part, on the filtered output voltage signal.

In an alternative embodiment, although the invention is not limited in scope in this respect, a system may include a computing platform including a DC-to-DC converter circuit to convert from voltage level that will be applied to the platform to an approximate voltage signal level capable of driving a processor that may be included in the computing platform. The computing platform may also include, in addition to a processor, such as a microprocessor, a memory, interface circuitry and a bus coupling the processor, memory and interface circuitry. Likewise, a system in accordance with the invention may comprise a variety of computing platforms, such as a server, or a personal computer, such as a laptop or desktop. Typically, although not necessarily, the DC-to-DC converter circuit is incorporated on the motherboard.

While certain features of the invention have been illustrated and described herein, many modifications, substitutions, changes and equivalents thereof will now occur to those skilled in the art. It is, therefore, to be understood that the appended claims are intended to cover all such modifications and changes as fall within the true spirit of the invention.

What is claimed is:

1. A circuit comprising: a DC-to-DC converter, said DC-to-DC converter comprising a plurality of ripple regulator DC-to-DC converter circuits, said plurality being coupled so that output signals produced by each of said ripple regulator DC-to-DC converter circuits is out of phase with respect to the other of said ripple regulator DC-to-DC converter circuits.

2. The circuit of claim 1, wherein said plurality of ripple regulator circuits comprises two ripple regulator circuits.

3. The circuit of claim 2, wherein said two ripple regulator circuits are coupled so that the output signals produced by each is approximately 180 degrees out of phase with respect to the other.

4. The circuit of claim 1, wherein said plurality of ripple regulator circuits are coupled so that the output signals produced by all of said plurality are approximately equally separated in phase with respect to immediately preceding and immediately succeeding output signals.

5. The circuit of claim 1, wherein said plurality of ripple regulator circuits comprises four ripple regulator circuits.

6. The circuit of claim 5, wherein said four ripple regulator circuits are coupled so that the output signals produced by each is out of phase with the others by approximately one of 90, 180 and 270 degrees.

7. The circuit of claim 1, wherein said DC-to-DC converter includes feedback circuitry to regulate the output voltage signal produced.

8. The circuit of claim 7, wherein each of said plurality of ripple regulator circuits have a different reference voltage level, said reference voltage level to be employed to regulate the output signal produced for each of said plurality of ripple regulator circuits.

9. The circuit of claim 7, wherein the reference voltage level is substantially the same for each of said plurality of ripple regulator circuits, said reference voltage level to be employed to regulate the output signal produced for each of said plurality of ripple regulator circuits.

10. The circuit of claim 1, wherein each of said ripple regulator circuits includes circuitry providing additional voltage margin based, at least in part, on a load current of a particular ripple regulator circuit.

11. The circuit of claim 1, wherein each of said ripple regulator circuits are coupled so that each is activated when an output voltage level of the DC-to-DC converter falls below a predetermined voltage level.

12. A method of converting a voltage signal from approximately one voltage signal level to approximately another voltage signal level comprising:

producing a plurality of ripple regulated voltage output signals based at least in part on approximately the one voltage signal level;

separating said plurality of ripple regulated voltage output signals in phase so that each of said plurality is out of phase with respect to the others of said plurality; and filtering the phase separated output signals to produce approximately the another voltage signal level.

13. The method of claim 12, wherein each of said plurality of ripple regulated voltage output signals are approximately equally separately in phase from an immediately preceding voltage output signal and an immediately succeeding voltage output signal.

14. The method of claim 13, wherein said plurality comprises four ripple regulated voltage output signals.

15. The method of claim 13, wherein said plurality comprises two ripple regulated voltage output signals.

16. The method of claim 12, and further comprising: regulating each of said plurality based, at least in part, on a filtered output voltage signal.

17. The method of claim 12, wherein separating said plurality of ripple regulated voltage output signals in phase comprises enabling only one of said ripple regulated voltage output signals to be produced at a given time.

18. A system comprising:

a computing platform including a processor, a memory, interface circuitry, and a bus coupling said processor, said memory and said interface circuitry;

said computing platform further including a DC-to-DC converter circuit to convert from approximately a to be applied voltage signal level to approximately a voltage signal level capable of driving said processor;

said DC-to-DC converter circuit comprising at least two ripple regulator DC-to-DC converter circuits, said at least two converter circuits being coupled so that the output signals produced by each is out of phase with respect to the rest of said at least two converter circuits.

19. The system of claim 18, wherein said converter circuit is incorporated on a motherboard of said computing platform.

20. The system of claim 19, wherein said computing platform comprises at least one of a personal computer and a server.

21. The system of claim 20, wherein said personal computer comprises at least one of a desktop computer and a laptop computer.

* * * * *

UNITED STATES PATENT AND TRADEMARK OFFICE
CERTIFICATE OF CORRECTION

PATENT NO. : 6,510,065 B1
DATED : January 21, 2003
INVENTOR(S) : Massie et al.

It is certified that error appears in the above-identified patent and that said Letters Patent is hereby corrected as shown below:

Column 5,
Line 64, delete "decreased", insert -- described --.

Signed and Sealed this

Nineteenth Day of August, 2003

JAMES E. ROGAN
*Director of the United States Patent and Trademark Office*